Nov. 12, 1968  G. KIPER  3,410,188
CAMERA SHUTTER WHICH ALSO FUNCTIONS AS A DIAPHRAGM
Original Filed Sept. 30, 1964  3 Sheets-Sheet 1
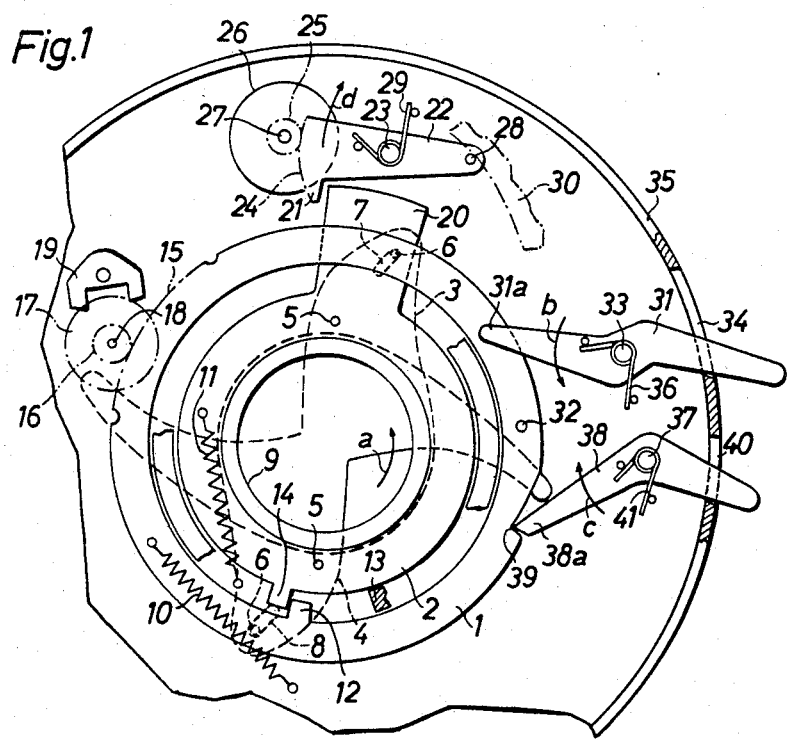
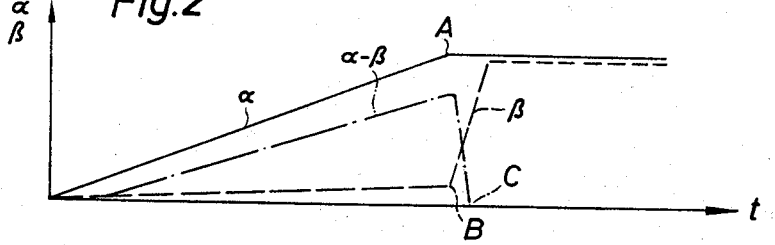
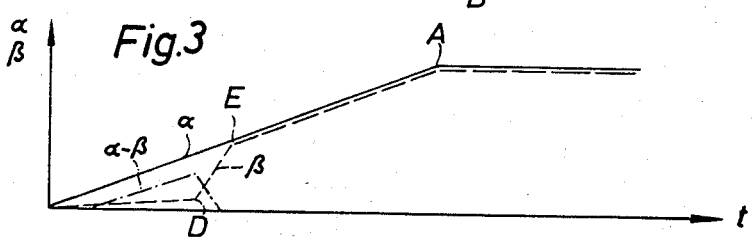
INVENTOR.
GERD KIPER
BY
Michael J. Striker

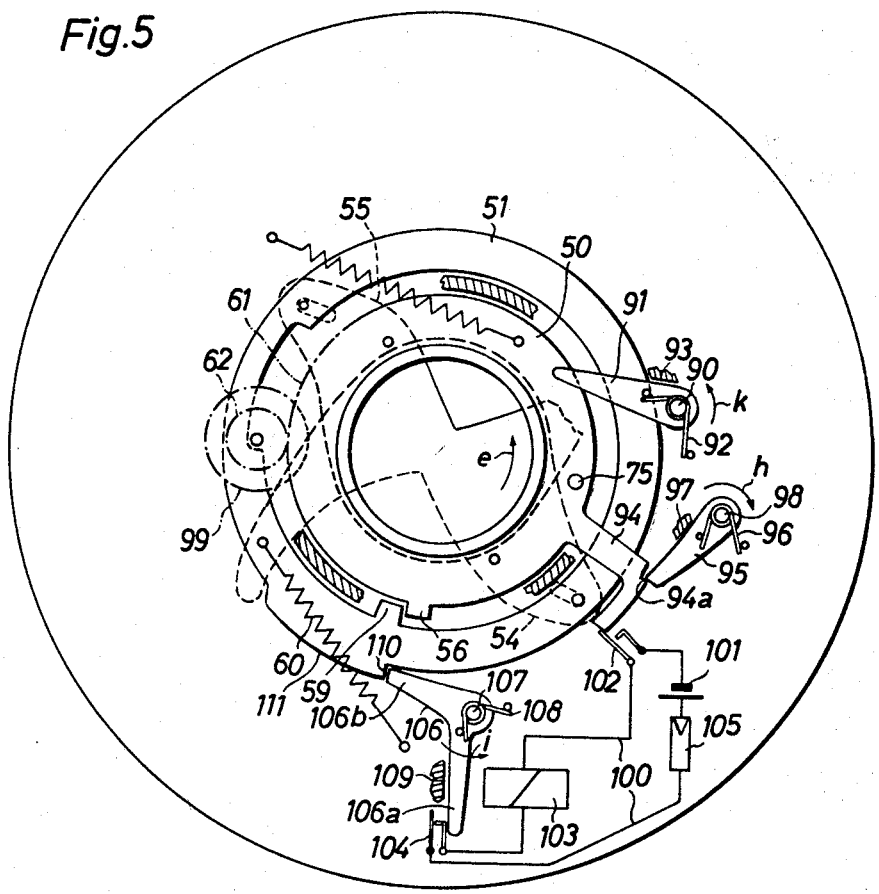

United States Patent Office 3,410,188
Patented Nov. 12, 1968

3,410,188
CAMERA SHUTTER WHICH ALSO FUNCTIONS AS A DIAPHRAGM
Gerd Kiper, Unterhaching, near Munich, Germany, assignor to Agfa Aktiengesellschaft, Leverkusen, Germany
Continuation of application Ser. No. 400,539, Sept. 30, 1964. This application Feb. 20, 1967, Ser. No. 617,416
Claims priority, application Germany, Oct. 5, 1963, A 44,226
16 Claims. (Cl. 95—10)

This application is a continuation of application Ser. No. 400,539, filed Sept. 30, 1964, now abandoned.

The present invention relates to cameras.

More particularly, the present invention relates to shutters of cameras and especially to that type of shutter which is also capable of functioning as a diaphragm.

One of the primary objects of the present invention is to provide for a shutter of this type a construction which renders it extremely convenient to accurately control both the exposure time and the size of the aperture.

In particular it is an object of the present invention to provide a structure which is capable of regulating the instant when the closing of the shutter starts so as to control in this way not only the exposure time but also the size of the aperture.

Furthermore, it is an object of the present invention to provide for a construction of the above type an extremely wide range of adjustments so that, for example, even relatively large exposure times can be combined with relatively large apertures, and at the same time extremely small exposure times and apertures can also be provided.

It is in particular an object of the present invention to provide a structure of the above type which is automatically adjustable for providing a proper exposure according to the lighting conditions.

Furthermore it is an object of the present invention to provide a structure of the above type which lends itself to manual adjustment.

The objects of the present invention also include the provision of a construction which is extremely simple as well as very rugged and reliable in operation.

With these objects in view the invention includes, in a camera, a plurality of shutter blades and a pair of coaxial shutter ring means which are operatively connected to the shutter blades for opening and closing them. One of the shutter ring means is a leading ring means which returns from a cocked position to a rest position in advance of the other of the ring means, which is a trailing ring means, so that in this way the shutter blades can be opened to make an exposure. The trailing ring means, when it follows the leading ring means to its rest position, returns the blades to their closed position. In accordance with the present invention a first retarding means is operatively connected to the leading ring means for retarding the return thereof to its rest position during the entire return movement of this leading ring means. Also, the structure of the invention includes an adjustable second retarding means which is operatively connected to the trailing ring means for retarding the release thereof, for return from a cocked to a rest position, to an extent which is adjustable for releasing the trailing ring means before, at, or after the end of the return movement of the leading ring means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly schematic elevational view of one possible embodiment of a shutter structure according to the present invention;

FIG. 2 is a graphic illustration of the operation of the structure of FIG. 1 at one setting thereof;

FIG. 3 is a graphic illustration of the operation of the structure of FIG. 1 at another setting thereof;

FIG. 5 is a partly sectional fragmentary elevation of a still further embodiment of a structure according to the present invention.

Figure 4:
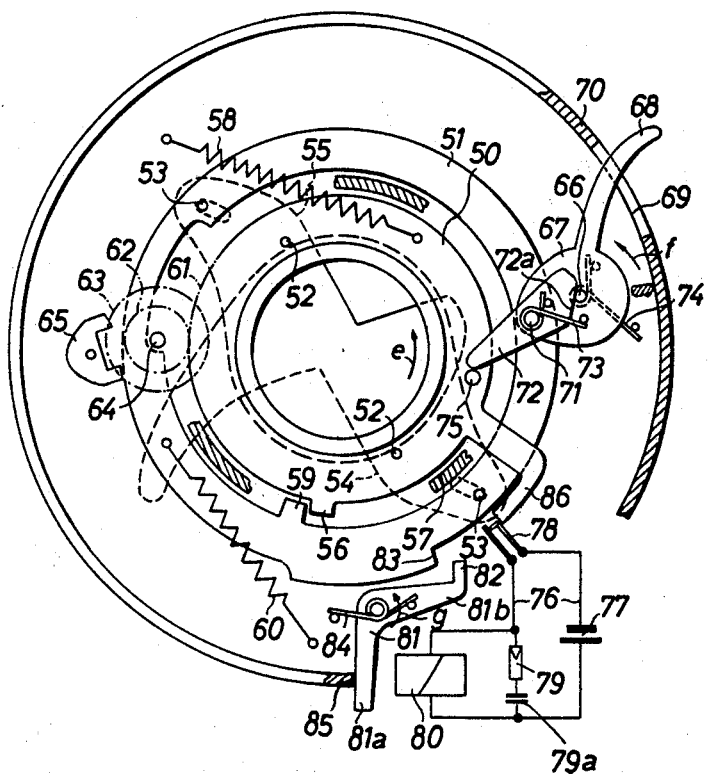
FIG. 4 is a partly sectional elevation of another embodiment of a structure according to the present invention.

Referring now to FIG. 1, there is illustrated therein a shutter which includes a pair of shutter rings 1 and 2, and these rings are supported for independent coaxial turning movement relative to each other as well as together. The illustrated shutter also includes a pair of shutter blades 3 and 4 which are pivotally connected with the ring 2 by a pair of pins 5 so that the blades 3 and 4 can turn about the pins 5 relative to the ring 2. Although only a pair of shutter blades are illustrated, it is to be understood that the invention is not limited to a structure which includes only a pair of shutter blades and can also be applied to shutters which include more than a pair of shutter blades. The shutter ring 1 also carries a pair of pins 6, and these pins 6 respectively extend into slots 7 and 8 which are respectively formed in the shutter blades 3 and 4. Thus, with this construction when the rings 1 and 2 turn together, so that there is no relative movement therebetween, the blades will not turn relative to each other and they will remain in a closed position, for example, while when one of the rings turns relative to the other the blades will be displaced either from a closed to an open position or from an open to a closed position.

The shutter of FIG. 1 is illustrated in its cocked position where the blades of course overlap each other and extend completely across the opening 9 through which an exposure is made, so that the shutter is closed in the cocked position illustrated in FIG. 1.

The ring 1 is a leading ring means which returns from the illustrated cocked position to its rest position in advance of the ring 2, which is a trailing ring means, so that in this way the turning of the ring 1 relative to the ring 2 will cause the blades to turn and thus the shutter will be opened in order to make an exposure. The trailing ring means then follows the leading ring means to its rest position, and then the rings 1 and 2 resume the illustrated angular position relative to each other, so that the blades are again closed.

A spring 10 is operatively connected with the leading ring 1 urging the latter to its rest position, and a spring 11 is operatively connected with the trailing ring 2 for urging the latter to return to its rest position, these rings turning in the direction of the arrow a, shown in FIG. 1, during return of the rings from their cocked to their rest positions. The leading ring 1 carries an inwardly directed projection 12 which engages a stationary stop member 13 in order to limit the turning of the ring 1 by the spring 10, and in this way the rest position of the ring 1 is determined, and the trailing ring 2 has an outwardly directed projection 14 engaging the projection 12 so that by engaging this latter projection 12 when the latter engages the projection 13 the rest position of the trailing ring 2 is also determined.

In accordance with one of the features of the present invention the leading ring 1 has a part of its periphery provided with gear teeth 15 which mesh with a pinion 16 which is coaxially fixed with an escapement wheel 17, and the pinion 16 and escapement wheel 17 are both supported for rotary movement by a stationary shaft 18.

The supporting wall of the shutter housing not only supports the shaft 18 on which elements 16 and 17 are mounted for rotation, but also supports for pivotal movement the escapement anchor 19 which cooperates with the escapement wheel 17. Thus, the parts 16–19 form a retarding means which retards the return of the leading ring 1 to its rest position by the spring 10, and the design of the retarding means 16–19 is such that the ring 1 is retarded in a substantially uniform manner throughout its entire return movement from its cocked position to its rest position in the direction of the arrow *a*.

The trailing ring means 2 includes an arm 20 which projects substantially radially from the ring 2, and a second, adjustable retarding means of the present invention cooperates with this arm 20 of the trailing ring means 2. The adjustable retarding means includes an elongated retarding lever 22 which at one end has a projection 21 situated in the path of movement of the projection 20 of the ring 2 when the latter seeks to return to its rest position under the action of the spring means 11. The retarding lever 22 is supported for rotary movement by a stationary shaft 23. That end of the lever 22 which is provided with the projection 21 which is situated in the path of movement of the projection 20 is also provided with a plurality of gear teeth 24 arranged along a circle whose center is in the axis of turning of the pivot pin 23, and this gear sector 24 meshes with a pinion 25 which is coaxially fixed with a rotary mass 26 which together with the pinion 25 are mounted for free rotary movement on the stationary pin 27 which is carried by the transverse wall of the shutter supporting structure. The end of the retarding lever 22 which is distant from the pinion 25 carries a pin 28 which is adapted to cooperate with a camming edge of an adjustable exposure-determining cam 30. A spring 29 is coiled about the pin 23 and has free ends respectively engaging a pin carried by the lever 22 and a stationary pin of the shutter so that the spring 29 urges the retarding lever 22 in a direction opposite to that indicated by the arrow *d* in FIG. 1. The schematically and fragmentarily illustrated controlling cam 30 is preferably a part of an unillustrated adjusting ring which is accessible to the operator for adjusting the exposure. This adjusting ring can be turned by hand and can cooperate with a scale of exposure values, so that in this way it is possible to select a position of the ring 30 which will provide a given exposure. However, instead of adjusting the ring 30 by hand it is also possible to turn the ring 30 in response to movement of a scanning mechanism into engagement with the pointer which is connected to the moving coil of a galvanometer which responds to the lighting conditions in a manner well known in the art, so that in this way the structure can also be automatically set in accordance with the lighting conditions.

A cocking lever 31 is accessible to the operator for cocking the shutter, and this cocking lever 31 has an inner free end 31*a* which is adapted to engage a pin 32 fixedly carried by the leading ring 1 in order to turn the latter in a direction opposite to that indicated by the arrow *a*. The outer end of the lever 31, which is supported for rotary movement by a stationary pivot pin 33, extends through a slot 34 of the shutter housing to the exterior where the outer end of the lever 31 is accessible to the operator, this slot 34 being formed in the outer wall 35 of the shutter housing. A spring 36 is coiled about the pin 33 and respectively engages pins carried by the stationary shutter wall and the lever 31 for urging the latter to turn in a direction opposite to the indicated by the arrow *b* in FIG. 1. The lever 31 is turned in the direction of the arrow *b* in order to cock the shutter.

The structure also includes a release lever 38 supported for turning movement by a stationary pin 37 and urged by spring 41 in the direction of the arrow *c* shown in FIG. 1, this lever 38 having a free end extending through a slot 40 of the wall 35, so that in this way the lever 38 is accessible to the operator. The inner end 38*a* of the lever 38 is adapted to cooperate with a notch 39 formed in the outer periphery of the leading ring 1, for retaining this leading ring 1, in opposition to the spring 10, in its cocked position illustrated in FIG. 1.

Assuming now that the parts are cocked, as shown in FIG. 1, and that the operator now turns the release lever 38 in a direction opposite to that indicated by the arrow *c*, then the end 38*a* of the lever 38 will move out of the notch 39 so as to release the ring 1 which now can be returned by the spring 10 to its rest position. However, the return movement of the ring 1 from its illustrated cocked position to its rest position is continuously retarded throughout the entire return movement thereof by the retarding means 16–19.

Of course, at the instant when the ring 1 is released for return to its rest position the spring 11 also seeks to return the ring 2 to its rest position, but at this time, although the projection 14 is free to follow the projection 12, the adjustable retarding means comes into play for preventing the return of the trailing ring 2 together with the leading ring 1. Directly after the release of the ring 2, its arm 20 engages the projection 21 of the retarding lever 22, and before the ring 2 can return to its rest position the arm 20 of the ring 2 must turn the lever 22 in opposition to the spring 29 through a distance sufficient to permit the outer periphery of the projection 20 to slide along the inner end of the projection 21, and in the rest position of the parts the inner end of the projection 21 engages the outer periphery of the projection 20, so that when the shutter is cocked this projection 20 moves beyond the projection 21 so as to release the lever 22 to the force of the spring 29. Before the spring 11 can displace the ring 2 and the projection 20 through the small angular distance required to situate the inner end of the nose 21 in engagement with the outer periphery of the projection 20, it is necessary for the spring 11 to overcome the retarding force of the second retarding means which retards the trailing ring means 2. Thus, this latter adjustable retarding means 22–26 prevents the ring 2 from returning to its rest position for a predetermined period of time. This latter period of time depends upon the adjustment of the adjustable retarding means 22–26. It is possible for the cam 30 of course to have a position such as that shown in FIG. 1, where almost the entire length of the projection 21 overlaps the projection 20, so that with this setting a relatively great retarding of the ring 2 is provided. However, if the camming ring 30 is adjusted so that only a small portion of the projection 21 overlaps the projection 20, then a relatively short retarding of the ring 2 will result.

Referring now to FIGS. 2 and 3, the manner in which the structure of FIG. 1 operates is graphically illustrated in these figures for two different settings of the ring or cam 30, respectively.

In the graphs of FIGS. 2 and 3 the abscissa represents the time which has elapsed from the moment when the ring 1 is released for return to its rest position, and the ordinate represents the angles through which the rings 1 and 2 turn, the angle α representing the angular turning of the ring 1, while the angle β represents the angular distance through which the ring 2 turns.

Referring now to FIG. 2, it will be seen that this graph illustrates the operation for an intermediate degree of retarding action provided by the adjustment of the retarding retarding means 22–26, the return of the ring 2 to its through which the ring 1 turns during its return to its rest position constantly increases in a uniform manner until the point A is reached, and this point represents the instant when the ring 1 has returned to its rest position so that the ring 1 stops turning when it reaches the point A. On the other hand, with this intermediate setting of the retarding means 22–23, the return of the ring 2 to its starting position is of course retarded, and the dotted line β indicates the operation of the ring 2. As may be seen from FIG. 2 initially the ring 2 turns through only an extremely small angle, and this is the relatively small almost negligible angle through which the ring 2 turns while its arm 20 remains in engagement with the projection 21. However, at the instant when the retarding means 22–26 is overcome, which is to say when the outer periphery of the arm 20 reaches the inner end of the projection 21, the ring 2 will be suddenly released to the full force of the spring 11 which will now return the ring 2 to its starting position without substantially any restraint on the movement of the ring 2 at this time, and the moment when the retarding means 22–26 releases the ring 2 is illustrated at the point B in FIG. 2, and it will be seen that beyond this point B the angular distance $\beta$ through which the ring 2 turns very suddenly increases, until the ring 2 reaches its rest position.

Of course, when the ring 2 reaches its rest position the shutter blades will again be closed, and the instant when the shutter closes is indicated at the point C of the curve $\alpha$—$\beta$ which is shown in dot-dash lines. This curve $\alpha$—$\beta$ of course indicates the extent to which the blades are turned so as to provide the exposure aperture, and of course it is clear that with the setting of FIG. 2 the exposure aperture will have an intermediate magnitude indicated by the curve $\alpha$—$\beta$.

Coming now to FIG. 3, the same operations as those of FIG. 2 are illustrated for a setting of the retarding means 22–26 which provides a much smaller retarding action than that of FIG. 1. With the setting which provides the diagram of FIG. 3 the projection 21 overlaps the arm 20 to only a small degree. The leading ring 1 of course still operates in the same way as in FIG. 2, so that the curve $\alpha$ is the same as that of FIG. 2 and of course at the point A the ring 1 has reached its rest position. However, because of the smaller retarding force the ring 2 is released by the retarding means at the point D in FIG. 3 and then very quickly turns to join the ring 1 in its return movement to the point A. At the point E in FIG. 3 the projection 14 of the trailing ring 2 has reached the projection 12 of the leading ring 1, and now of course the shutter is fully closed and the rings 1 and 2 turn together from the point E to the point A so that the shutter remains closed. It is apparent, therefore, that while the exposure time with the setting of FIG. 3 is less than that of FIG. 2, also the aperture has been reduced. This is immediately apparent from comparing the curves $\alpha$—$\beta$ of FIG. 3 with that of FIG. 2. It is thus clear from the diagrams of FIGS. 2 and 3 that with the adjustable retarding means 22–26 it is possible to provide any desired exposure time, although with the relatively long exposure times, which can be extended beyond the time when the ring 1 reaches its rest position, the aperture will of course be fully open. In other words at any setting where the trailing ring 2 does not start to return toward its rest position until after the leading ring 1 has reached its rest position, the shutter will necessarily provide the largest possible exposure aperture.

After an exposure has been completed in the above-described manner with the embodiment of FIG. 1, the lever 31 is turned by the operator in the direction of the arrow $b$ in order to cock the shutter in preparation for making the next exposure. The inner end 31a of the arm 31 will now engage the pin 32 so as to turn the leading ring 1 in opposition to the spring 10 in a direction opposite to that indicated by the arrow $a$. Because the projection 14 is in the path of turning of the projection 12 the trailing ring 2 will necessarily turn with the ring 1 at this time so that the spring 11 is also tensioned. When the rings 1 and 2 reach their cocked positions, and it should be noted that at this time since there is no relative turning between these rings the shutter blades remain in their closed position, the inner end 38a of the release lever 38 is urged by the spring 41 in the direction of the arrow $c$ into the notch 39, so that the return of the rings 1 and 2 back to their rest positions is prevented until the operator turns the release lever 38 in a direction opposite to that indicated by the arrow $c$, so as to repeat the operations described above.

When the operator releases the cocking lever 31 it is returned by the spring 36 to the illustrated rest position of the cocking lever.

According to the embodiment of the invention which is illustrated in FIG. 4, there is also a pair of shutter rings 50 and 51, and in this case it is the inner shutter ring 50 which is the leading ring while the outer shutter ring 51 is the trailing ring. The inner ring 50 is pivotally connected by pivot pins 52 with the pair of shutter blades 54 and 55, and the outer or trailing ring 51 is connected by pins 53 with the shutter blades, these pins 53 respective extending into slots of the shutter blades. Here again it is to be understood that the invention is by no means limited to a shutter which includes only a pair of shutter blades. The leading ring 50 is provided with an outwardly directed projection 56 which, by engagement with a stationary slot member 57, determines the rest position of the ring 50 under the action of the spring 58 which urges the ring 50 in the direction of the arrow $e$ to its rest position. The trailing ring 51 has an inwardly directed projection 59 overlapping the projection 56, and in the cocked position of the shutter which is shown in FIG. 4 the projection 59 engages the projection 56. A spring 60 urges the trailing ring 51 to turn in the direction of the arrow $e$.

As was the case with the embodiment of FIG. 1, the leading ring 50 is provided with teeth 61 at its outer periphery, and these teeth mesh with a pinion 62 which is coaxially fixed with an escapement wheel 63 which meshes with an escapement anchor 65, the coaxial elements 62 and 63 being supported for rotary movement by a stationary shaft 64, so that this embodiment also includes a retarding means which is operatively connected with the leading ring 50 for retaining the latter in a substantially uniform manner throughout its return movement.

In order to cock and release the shutter of FIG. 4, there is available to the operator a cocking and releasing lever 67 which is supported for turning movement by a stationary pin 66 and which has an arm 68 extending through a slot 69 in the outer shutter housing wall 70 to the exterior thereof so as to be accessible to the operator. Thus, the operator can actuate the lever 67 by hand.

This lever 67 carries a pin 71 on which a swing-lever 72 is supported for rotary movement, and a spring 73 is coiled about the pin 71 and engages pins carried by the lever 72 and the lever 67 for urging the lever 72 to turn in a clockwise direction about the pin 71, as viewed in FIG. 4 so that the spring 73 releasably maintains the edge portion 72a of the lever 72 in engagement with the pivot pin 66 for the lever 67. A spring 74 is coiled about the pin 66 and engages a stationary pin and a pin carried by the lever 67 so as to urge the latter to turn in a clockwise direction, opposite to the direction indicated by the arrow $f$ in FIG. 4. When the operator turns the lever 67 in the direction of the arrow $f$, the free end of the lever 72 engages a pin 75 carried by the leading ring 50, so that this ring 50 will be turned in opposition to the spring 58 in a direction opposite to that indicated by arrow $e$, and of course the trailing ring 51 will also be turned at this time in opposition to the spring 60, so that in this way the rings 50 and 51 are displaced from their rest toward their cocked positions by turning of the lever 67 in the direction of the arrow $f$.

The embodiment of FIG. 4 also includes an adjustable retarding means for adjustably determning the instant when the trailing ring 51 will be released for return to its rest position, and in this embodiment the adjustable retarding means is electrical. This adjustable retarding means includes the circuit 76 in which a source of current 77, a switch 78, and a photosensitive resistor 79 as well as a capacitor 79a are connected in series. The source of current 77 can be in the form of a battery or a miniature cell. Preferably the source 77 is situated in the interior of the camera and the photosensitive resistor 79 is situated at the front end of the camera so as to be exposed through a suitable window or the like to the light to which the camera itself is exposed. Connected in parallel with the series connected resistor 79 and capacitor 79a is a relay 80 which includes an armature 81a in the form of a holding pawl 81 supported for turning movement on a stationary pivot and having a free end 82 which cooperates with a shoulder 83 formed at the periphery of the trailing ring 51 for preventing return of the latter to its rest position until the end 82 of the pawl 81 is displaced away from the shoulder 83. The arm 81b of the pawl 80 carries a stationary pin which is engaged by a spring 84 which is coiled about the pivot of the pawl and which engages a stationary pin so as to urge the pawl 81 in a clockwise direction, opposite to the direction indicated by the arrow g, into engagement with the stop 85, and the armature portion 81a of the pawl 81 is shown in engagement with the stop 85 in FIG. 4.

The switch 78 is a normally open switch which due to its own resiliency seeks in and of itself to remain in its open position. In order to close the switch 78 the leading ring 50 is provided with a projecting portion 86 which during the cocking of the shutter engages the switch 78 so as to close the latter just before the ring 50 is released for return to its rest position. It is to be noted that with the shutter of FIG. 4 the operator turns the cocking lever 67 in the direction of the arrow f until the inner free end of the swing lever 72 rides off the pin 75 whereupon the shutter is released to make an exposure. Thus, as the operator turns the cocking lever 67, the projection 86 of the ring 50 will approach the switch 78 and just before the tip of the lever 72 reaches and rides off the pin 75 the projection 86 will momentarily close the switch 78. In the position of the parts shown in FIG. 4, the projection 86 has just closed the switch 78 and the relay 80 is about to attract the armature portion 81a of the pawl 81 so as to move the pawl tooth 82 into engagement with the shoulder 83, but because of the very slight delay in the response of the relay 80 to the closing of the switch 78 the parts are shown in FIG. 4 in that instantaneous position they take just after the switch 78 is closed but just before the armature 81 has turned in the direction of the arrow g to the coil of the relay 80 so as to place the tooth 82 in engagement with the shoulder 83.

In order to make an exposure with the embodiment of FIG. 4, the operator turns the cocking and release lever 67 in the direction of the arrow f, so that the lever 72 engages pin 75 and turns both of the rings 50 and 51 in a direction opposite to that indicated by the arrow e. In this way the spring 58 and 60 are simultaneously tensioned. At the end of the cocking movement, the projection 86 of the leading ring 50 engages and closes the switch 78. The circuit 76 is therefore closed and the capacitor 79a becomes charged. Also, the relay 80 becomes energized and turns the pawl 81 in the direction of the arrow g so that the tooth 82 engages the shoulder 83 to hold the trailing ring 51 against return movement from its cocked position.

The continued turning of the lever 68 by the operator causes the lever 72 to ride off the pin 75 so that the leading ring 50 is now released while the trailing ring 51 is retained in its cocked position, and the turning of the ring 50 with respect to the ring 51 will of course open the shutter blades. The retarding means 61–65 operates at this time to constantly and uniformly retard the return movement of the leading ring 50 throughout its entire return movement, by the spring 58. Immediately after the ring 50 starts its return movement the switch 78 opens and the flow of current in the circuit 76 is terminated. The shunt resistor 79, however, delays the deenergizing of the relay 80 because the compensating current of the shunt circuit flows through the relay coil. The time required for the relay 80 to release the pawl 81 to the spring 84 depends upon the resistance of the resistor 79, and this resistance of course is determined by the lighting conditions. The photosensitive resistor 79 is a conventional resistor of this type which provides a relatively small resistance at large light intensities and a relatively great resistance at low light intensities. The capacitor 79a is charged while the switch 78 is closed and after opening of the switch discharges through the relay 80 and the resistor 79. Therefore, at great light intensities when the resistance is small the discharge of the capacitor takes place very quickly and the relay 80 releases the lever 81 in a relatively short time so that a short exposure time is produced.

When the relay 80 releases the pawl 81 the spring 84 returns it into engagement with the stop 85. Now the trailing ring 51 is released for return by spring 60 to its rest position.

Thus, with this embodiment the electrical retarding means is capable of providing different exposure times and apertures in the same way as the mechanical retarding means of FIG. 1.

When the operator releases the lever 67, the spring 74 returns it to its rest position in a direction opposite to that indicated by the arrow f, and at this time the swing lever 72 can turn past the pin 75 since the spring 73 yields at this time and returns the lever 72 to its illustrated position relative to the lever 67 as soon as the lever 72 moves beyond the pin 75.

The shutter of FIG. 5 is identical with that of FIG. 4, the only difference being that the shutter of FIG. 5 can be retained in its cocked position and for this purpose the structure for cocking and releasing the shutter and for retarding the trailing ring 51 is different from that of FIG. 4. Thus, a rotary shaft 90, which is turned by the operator in connection with advance of the next film frame into position to be exposed, fixedly carries a cocking lever 91 which engages the pin 75 of the leading ring 50 to cock the shutter when the shaft 90 is turned in the direction of the arrow k. A spring 92 urges the lever 91 and the shaft 90 to a rest position where the lever 91 engages the stationary stop member 93.

The leading ring 50 of FIG. 5 carries a projection 94 which has a notch 94a for receiving the free end of the release lever 95 which is urged by a spring 96 in the direction of the arrow h against a stationary stop member 97. The release lever 95 is fixed to a shaft 98 which can be turned by the operator in a direction opposite to that indicated by the arrow h.

In this embodiment, the retarding means for the leading ring 50 is in the form of a rotary mass. Thus, in this case the pinion 62 is coaxially fixed with the rotary mass 99, this pinion 62 meshing with the teeth 61 of the ring 50 in the same way as in the embodiment of FIG. 4. Instead of this particular type of retarding means it is possible to use other known retarding structures such as, for example, a pneumatic retarding mechanism.

The electrical retarding means for the trailing ring 51 of FIG. 5 includes the electrical circuit 100 in which the source 101, the switch 102, the relay 103, a second switch 104, and a photosensitive resistor 105 are connected in series. The switch 102 is a normally closed switch capable of being opened by the projection 94 of the ring 50. The switch 104, on the other hand, is a normally open switch capable of being closed by the arm 106a of a pawl 106. This pawl 106 is turnably supported by a stationary pin 107 and is urged by a spring 108 into engagement with the stationary stop 109 as well as into engagement with the shoulder 110 of the trailing ring 51. Thus, when the arm 106b snaps behind the shoulder 110, the arm 106a will move to the stop 109 and close the switch 104.

The structure is shown in FIG. 5 in its cocked position. In order to make an exposure the operator will turn the release lever 95 in a direction opposite to that indicated by the arrow h, so that the projection 94 of the leading ring 50 is released and now the spring 55 can start to return the leading ring 50 in the direction of the arrow *e* back toward its rest position. The entire return movement of the leading ring 50 is however uniformly retarded by the retarding means 62, 99. At the beginning of the return movement of the leading ring 50, the projection 94 moves away from the switch 102 which therefore closes. Since the switch 104 is also closed at this time, current flows through the circuit 100.

The relay 103 will attract the armature 106a in the direction of the arrow *i* toward the coil of the relay after a time interval which is determined by the magnitude of the resistance provided by the photosensitive resistor 105, so that in this way the release of the trailing ring 51 is determined by the lighting conditions. The movement of the arm 106b of the pawl 106 away from the shoulder 109′ of the trailing ring 51 permits the spring 60 to return the projection 59 into engagement with the projection 56 without any substantial resistance to the turning of the ring 51 at this time. The shutter blades will therefore return to their closed position, and with this construction it is apparent that the light intensity determines not only the exposure time but also the size of the exposure aperture.

In order to again cock the shutter of FIG. 5, the operator turns the cocking lever 91 in the direction of the arrow *k*. The lever 91 engages the pin 75 of the ring 50 so as to turn the latter together with the ring 51 in a direction opposite to that indicated by the arrow *e*, until the release lever 95 is again received in the notch 94a. Of course, at the end of the cocking of the shutter the switch 102 is again opened and of course the switch 104 is closed.

Of course, the invention is not limited to the specific retarding structures described above and shown in the drawing. Thus, other electrical circuits can be used to accomplish the same results as those achieved by the disclosed electrical retarding structures of FIGS. 4 and 5.

Furthermore, instead of the mechanical retarding means 22–26 of FIG. 1, it is possible to use a pneumatic retarding means capable of being automatically regulated in accordance with the lighting conditions. Thus, with such a construction the moving coil of the galvanometer will control the extent to which a cylinder of the pneumatic retarding structure is covered. The cover of the cylinder can be turned by the moving coil to a position providing a discharge opening for the cylinder which is of a larger or smaller size depending upon the angular position of the moving coil, so that the resistance to the movement of a piston in the cylinder can be regulated, and it is this piston which is displaced by the trailing ring until the piston reaches a position releasing the trailing ring for substantially unrestrained movement until its projection 14 engages the projection 12 of the leading ring. Thus, since the angular position of the moving coil of such an assembly is automatically determined by the lighting conditions, this pneumatic retarding means will accurately determine the extent of exposure in accordance with the lighting conditions.

It will be understood that each of the elements described above, or two or more together, may also find a useful application in other types of camera differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a plurality of shutter blades; coaxial leading and trailing shutter ring means operatively connected to said shutter blades for opening and closing the latter, said leading ring means returning from a cocked position to a rest position in advance of said trailing ring means for opening the shutter blades to make an exposure, the trailing ring means upon following the leading ring means to its rest position returning the blades to their closed position; first retard means operatively connected to said leading ring means for retarding the return thereof to rest position during the entire return movement of said leading ring means; adjustable second retard means operatively connected to said trailing ring means for retarding the release thereof, for return from a cocked to a rest position, to an extent which is adjustable for releasing said trailing means before, at, or after the end of the return movement of said leading ring means; and spring means urging said trailing ring means to said rest position thereof, said spring means opposing said second retard means and said second retard means when reaching a given release position, to which said second retard means is displayed by the force of said spring means, releasing said trailing ring means for substantially unrestrained return by said spring means to its rest position.

2. A combined camera shutter and diaphragm, comprising a plurality of shutter blades; movable leading and trailing shutter operating means operatively connected to said shutter blades for opening and closing the latter, said leading means returning from a first position where the shutter is cocked to a rest position in advance of said trailing means for opening the shutter blades to provide a diaphragm opening, the trailing means upon following the leading means to its rest position returning the blades to their closed position; first retard means operatively connected to said leading means for retarding the return thereof to rest position during the entire return movement of said leading means; and adjustable electrical second retard means operatively connected to said trailing means for retarding the release thereof for return from a first position where the shutter is cocked to a rest position, said second retard means being constructed and arranged to release said trailing means to an adjustable extent prior to completion of return movement of said leading means and including a photosensitive resistor, a relay, and an electrical circuit connected with said resistor and relay for actuating the latter to release said trailing means for return to rest position according to the intensity of light reaching said resistor, said circuit including a source of current and a switch which closes said circuit for actuating said relay according to the intensity of light reaching said resistor, said switch, source of current and resistor being connected in series and said leading means momentarily closing said switch just prior to return of said leading means to rest position so that said switch remains open except for the momentary closing thereof by said leading means, said relay being connected in parallel with said resistor and including an armature in the form of a holding pawl which holds said trailing means against return to rest position in response to closing of said switch, said relay releasing said pawl for movement away from said trailing means during progressive deenergizing of said relay commencing with the opening of said switch, the time required for said relay to be deenergized sufficiently to release said pawl being determined by the resistance of said resistor.

3. A combined camera shutter and diaphragm, comprising a plurality of shutter blades; movable leading and trailing shutter operating means operatively connected to said shutter blades for opening and closing the latter, said leading means returning from a first position where the shutter is cocked to a rest position in advance of said trailing means for opening the shutter blades to provide a diaphragm opening, the trailing means upon following the leading means to its rest position returning the blades to their closed position; first retard means operatively connected to said leading means for retarding the return thereof to rest position during the entire return movement of said leading means; and adjustable electrical second retard means operatively connected to said trailing means for retarding the release thereof for return from a first position where the shutter is cocked to a rest position, said second retard means being constructed and arranged to release said trailing means to an adjustable extent prior to completion of return movement of said leading means and including a photosensitive resistor, a relay, and an electrical circuit connected with said resistor and relay for actuating the latter to release said trailing means for return to rest position according to the intensity of light reaching said resistor, said circuit including a source of current and a switch which closes said circuit for actuating said relay according to the intensity of light reaching said resistor, said source of current, switch, relay and resistor all being connected in series in said circuit and said relay including an armature in the form of a pawl holding said trailing means against return to its rest position until said pawl is attracted to a coil of said relay, said switch being closed upon displacement of said leading means from first position toward rest position and said leading means opening said switch and maintaining it open until the start of return movement of said leading means, said circuit further including a second switch closed by said pawl while the latter prevents return of said trailing means to rest position and opened when said pawl is attracted to said coil to release said trailing means.

4. In a camera, in combination, a plurality of shutter blades; coaxial leading and trailing shutter ring means operatively connected to said shutter blades for opening and closing the latter, said leading ring means returning from a cocked position to a rest position in advance of said trailing ring means for opening the shutter blades to make an exposure, the trailing ring means upon following the leading ring means to rest position returning the blades to their closed position; first retard means operatively connected to said leading ring means for retarding the return thereof to rest position during the entire return movement of said leading ring means; and adjustable second retard means operatively connected to said trailing ring means for retarding the release thereof, for return from a cocked to a rest position, to an extent which is adjustable for releasing said trailing ring means before, at, or after the end of return movement of said leading ring means, said second retard means being electrical and including a photosensitive resistor, a relay, and an electrical circuit connected with said resistor and relay and including a source of current and a switch which closes said circuit for actuating said relay to release said trailing ring means for return to rest position according to the intensity of light reaching said resistor, said switch, source of current and resistor being connected in series and said leading ring means momentarily closing said switch just prior to return of said leading ring means to rest position so that said switch remains open except for the momentary closing thereof by said leading ring means, said relay being connected in parallel with said resistor and including an armature in the form of a holding pawl which holds said trailing ring means against return to rest position in response to closing of said switch and said relay releasing said pawl for movement away from said trailing ring means during progressive de-energizing of said relay commencing with the opening of said switch, the time required for said relay to be de-energized sufficiently to release said pawl being determined by the resistance of said resistor.

5. In a camera, in combination, a plurality of shutter blades; coaxial leading and trailing shutter ring means operatively connected to said shutter blades for opening and closing the latter, said leading ring means returning from a cocked position to a rest position in advance of said trailing ring means for opening the shutter blades to make an exposure, the trailing ring means upon following the leading ring means to rest position returning the blades to their closed position; first retard means operatively connected to said leading ring means for retarding the return thereof to rest position during the entire return movement of said leading ring means; and adjustable second retard means operatively connected to said trailing ring means for retarding the release thereof, for return from a cocked to a rest position, to an extent which is adjustable for releasing said trailing ring means before, at, or after the end of the return movement of said leading ring means, said second retard means being electrical and including a photosensitive resistor, a relay and an electrical circuit connected with said resistor and relay and including a source of current and a switch which closes said circuit for actuating said relay to release said trailing ring means for return to rest position according to the intensity of light reaching said resistor, said source of current, switch, relay and resistor all being connected in series in said circuit and said relay including an armature in the form of a pawl holding said trailing ring means against return to rest position until said pawl is attracted to a coil of said relay, said switch being closed upon displacement of said leading ring means from cocked position toward rest position and said leading ring means opening said switch and maintaining it open until the start of return movement of said leading ring means, said circuit including a second switch closed by said pawl while the latter prevents return of said trailing ring means to rest position and opened when said pawl is attracted to said coil to release said trailing ring means.

6. A combined camera shutter and diaphragm, comprising a plurality of shutter blades; movable leading and trailing shutter operating means operatively connected to said shutter blades for opening and closing the latter, said leading means returning from a first position where the shutter is cocked to a rest position in advance of said trailing means for opening the shutter blades to provide a diaphragm opening which admits scene light to an entire film frame, the trailing means upon following the leading means to its rest position returning the blades to their closed position and at least one of said leading and trailing means being turnable between said positions thereof; first retard means operatively connected to said leading means for retarding the return thereof to rest position during the entire return movement of said leading means; and adjustable second retard means operatively connected to said trailing means for retarding the release thereof, for return from a first position where the shutter is cocked to a rest position, said second retard means being constructed and arranged to release said trailing means to an adjustable extent before the end of return movement of said leading means.

7. A combined camera shutter and diaphragm, comprising a plurality of shutter blades arranged to provide a central opening; leading and trailing shutter operating means turnably mounted for turning movement and operatively connected to said shutter blades for opening and closing the latter, said leading means returning from a first position where the shutter is cocked to a rest position in advance of said trailing means for opening the shutter blades to provide a diaphragm opening, the trailing means upon following the leading means to its rest position returning the blades to their closed position; first retard means operatively connected to said leading means for retarding the return thereof to rest position during the entire return movement of said leading means; and adjustable second retard means operatively connected to said trailing means for retarding the release thereof, for return from a first position where the shutter is cocked to a rest position, said second retard means being constructed and arranged to release said trailing means to an adjustable extent before the end of return movement of said leading means.

8. In a camera as recited in claim 7, said second retard means being manually adjustable.

9. In a camera as recited in claim 7, said second retard means being automatically adjustable according to the lighting conditions.

10. In a camera as recited in claim 7, said second retard means being electrical.

11. In a camera as recited in claim 10, said electrical second retard means including a photosensitive resistor, a relay, and an electrical circuit connected with said resistor and relay for actuating the latter to release said trailing means for return to rest position according to the intensity of light reaching said resistor.

12. In a camera as recited in claim 11, said circuit including a source of current and a switch which closes said circuit for actuating said relay according to the intensity of light reaching said resistor.

13. In a camera according to claim 7, further comprising manually operable shutter release means operatively connected to said first retard means and to said second retard means for simultaneously initiating retarding of said leading and trailing means.

14. In a combined camera shutter and diaphragm, in combination, leading and trailing operating means for respectively opening and closing the shutter, each of said operating means being movable between a first position in which the shutter is cocked and a second position, at least one of said operating means being turnable between said positions thereof; first retard means for retarding the entire movement of said leading means from first to second position opening the shutter to provide a diaphragm opening which admits scene light to an entire film frame; adjustable second retard means for retarding movement of said trailing means from first to second position closing the shutter, said second retard means releasing said trailing means for movement from first to second position prior to completion of return movement of said leading means from first to second position; and means for simultaneously initiating actuation of both said retard means.

15. In a camera, the combination of a between-the-lens shutter; first shutter operating means movable from a first position attained by cocking the shutter to a rest position to thereby open the shutter so that scene light can reach an entire film frame; second shutter operating means movable from a first position attained by cocking the shutter to a rest position to thereby close the shutter, at least one of said operating means being turnable between said positions thereof; first retard means operatively connected with said first shutter operating means for retarding the entire movement of said first shutter operating means to rest position; and electrical second retard means including a photosensitive element, a relay and an electrical circuit connected with said photosensitive element and relay, said relay being arranged to release said second shutter operating means for movement to rest position with a delay which is a function of the intensity of light reaching said photosensitive element.

16. In a camera the combination of a between-the-lens shutter; first shutter operating means movable from a first position attained by cocking the shutter to a rest position to thereby open the shutter; second shutter operating means movable from a first position attained by cocking the shutter to a rest position to thereby close the shutter, at least one of said shutter operating means being a ring which is rotatable between said positions thereof; first retard means operatively connected with said first shutter operating means for retarding the entire movement of said first shutter operating means to rest position; and electrical second retard means including a photosensitive element, a relay and an electrical circuit connected with said photosensitive element and relay, said relay being arranged to release said second shutter operating means for movement to rest position with a delay which is a function of the intensity of light reaching said photosensitive element.

References Cited

UNITED STATES PATENTS

| | | | |
|---|---|---|---|
| 2,890,640 | 6/1959 | Noack | 95—63 |
| 3,069,989 | 12/1962 | Kiper | 95—63 |
| 3,116,670 | 1/1964 | Ball | 95—10 |
| 3,208,365 | 9/1965 | Cooper | 95—63 |

JOHN M. HORAN, *Primary Examiner.*